UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD FOR PRODUCING BASIC TITANIC-SULFATE PRODUCTS AND PURE TITANIC OXID THEREFROM.

1,223,358. Specification of Letters Patent. Patented Apr. 24, 1917.

No Drawing. Application filed August 29, 1916. Serial No. 117,399.

*To all whom it may concern:*

Be it known that I, LOUIS E. BARTON, a citizen of the United States, and a resident of Niagara Falls, in the county of Niagara and State of New York, have invented a certain new and useful Method for Producing Basic Titanic-Sulfate Products and Pure Titanic Oxid Therefrom, of which the following is a specification.

My present invention relates to methods for producing, in industrially important and useful quantities, substantially pure titanic oxid, and by production, and utilization, to that end of substantially such an essentially basic titanic sulfate product as is described and claimed in the herewith copending application of Auguste J. Rossi and myself, Serial Number 77,469, filed February 10, 1916, the same being a division of our original application Serial Number 733,943, filed November 29, 1912; and the objects of my present invention comprise provision of methods whereby such products are obtainable more rapidly, certainly, economically, and of better properties, including higher titanic percentages, than heretofore.

In the herewith copending application of said Rossi and myself, Serial Number 13,478, filed March 10, 1915, is described, and claimed, a method of producing such basic titanic sulfate products by aid of proper dilution and boiling of a titanic sulfate solution, whereby there is therein precipitated a basic titanic sulfate, and in our said application Serial No. 733,943, we have also described, and claimed, another method for a similar purpose by aid of properly diluting a titanous sulfate solution and boiling it in presence of an oxidizing agent such as the atmosphere, or, preferably, nitric acid.

My present method is distinguishable from these, and from all others known to me, by reason of its utilizing my discoveries that titanic sulfate solutions can be usefully, if not always entirely, reduced to titanous sulfate solutions by electrolysis, and this by aid of merely passing therethrough an electric current between a pair of therewith-contacting electrodes, as distinguished from employing a diaphragm, or diaphragm cell; and that, while such solution is being thus electrolyzed, mere heating thereof, as distinguished from boiling, is sufficient to insure therein precipitation of as much basic titanic sulfate as required, and the thereafter obtainment, from such precipitate, of a final dried basic titanic product at less expense than heretofore and of superior quality and properties, including particularly greater purity than any known to me.

It is also to be noted that my present method advantageously enables solutions more concentrated than heretofore to be employed, and results in correspondingly larger yield of the desired final product from a given operation; also that my dispensing with boiling temperatures is correspondingly economical. Furthermore, my present method provides relatively ideal conditions for precipitation of a pure product, since thereby iron present is constantly maintained in the ferrous state by the electrolysis, and by the continuous presence of titanous sulfate. The advantages of being able to suitably electrolyze without resort to a diaphragm will also be understood, and particularly as regards economy in construction and maintenance, as well as in power. Nor, by my present method, is there need of adding sulfuric acid to the solution as in some instances theretofore.

The process of my present invention is practised as follows:

I first produce a titanic sulfate solution, in any convenient manner, and from any titaniferous material; but I prefer to do this by dissolving in sulfuric acid the titanic acid product of the method described and claimed in Letters Patent No. 1,171,542, granted to said Rossi and myself on February 15, 1916; because the titanic sulfate solution thus obtained is particularly free from impurities, and contains little, if any, free sulfuric acid, and about 11% of titanic oxid. This, or whatever other solution I employ, I dilute until it contains say about 3% of titanic oxid. I have, however, found it preferable, for various reasons, including the thereby expediting of the subsequent operations, to use, if possible, a titanic basic sulfate solution instead of the neutral solution first referred to.

I, therefore, preferably, convert the latter to basic condition in any convenient manner, such, for example, as by adding, to such concentrated titanic sulfate solution, lime slaked in five parts of water. The quantity of lime thus added, in any case, may be varied according to the results desired; but, I have discovered that, for the purpose of subsequently precipitating basic titanic sulfate, an addition of lime chemically equivalent to 20% of the total sulfate in solution is sufficient. After the addition thereto of what may be termed lime-cream, I allow the charge to stand for, say, from about one-quarter to one-half of an hour, during which I agitate it from time to time, if only for the purpose of insuring a more complete combination of the ingredients.

The resulting calcium sulfate I then filter out, and dilute the filtrate so that it shall contain, as in the previously referred to instance, about 3% of titanic oxid.

The sulfate solutions, thus including either of mine above described, I then electrolyze. This, as aforesaid, I prefer to accomplish by aid of passing therethrough an electric current between a pair of electrodes immersed in, or contacted by, the solution. In so doing I, usually, employ a pair of metallic, preferably lead, electrodes, in an undiaphragmed electric cell, and while the voltage may be varied quite considerably, I have discovered that a current of from 5 to 10 volts, and of a current density at the anode of about 30 amperes per square foot, gives satisfactory results. It will be noted that I thus utilize my discovery that in the required treatment, for my purposes, of the solutions employed, a diaphragm, or a diaphragmed cell, is dispensable.

During the aforesaid electrolysis, I heat, as distinguished from boiling, my solution. Such heating, preferably up to from say 90° C. to 95° C., I effect in any convenient manner, as, for example, by injecting live steam. But I can obtain, in some instances, and according to conditions, passable results with temperatures a little lower than those mentioned. Higher temperatures may be used even up to boiling, though such higher temperatures are, for reasons above referred to and others, rarely, if ever, desirable.

In my operations of my said process, I have obtained yields of from 85% to 90% of the total titanic oxid in the solution in from two and a half to five hours; but the time required will, of course, in each specific instance, depend upon the temperature and the current conditions.

My resulting precipitate of basic titanic sulfate is, as usual, filtered out and dried, and is of exceptional value for many uses in various arts.

This final product of my present process is devoid of iron and other impurities, except negligibly, and, as stated in Serial No. 77,469, above referred to, usually contains, by analysis—

Titanic oxid_____ 70% to 80%
Sulfuric anhydrid____ 5% to 10%
Combined water_____ 15% to 20%

This product I, for certain purposes, calcine, to substantially complete dehydration, at say about 750° C., thereby obtaining a further product which consists essentially of pure titanic oxid ($TiO_2$).

The relative success of my present process, as compared with all others known to me, is, I believe, largely attributable to the alternate reduction and re-oxidation of the freely circulating solution or electrolyte; the de-oxidation at the negative electrode being greater than the re-oxidation at the positive, whereby titanous sulfate is constantly maintained in the solution; but the re-oxidation is sufficient to render other oxidizing agents, such as nitric acid, dispensable, while at the same time facilitating and accelerating the formation of a basic, instead of a normal, sulfate, which precipitates while the solution is being simultaneously heated.

I am aware that Letters Patent No. 758,710, granted to Howard Spence, May 3rd, 1904, purport to disclose the reduction of titanic sulfate solutions to titanous sulfate solutions by aid of using the former as a catholyte, and thereby electrolyzing it in a diaphragm cell, and this step I do not wish to be understood as constituting, by itself, any part of my invention, or as covered by my herein claims.

What I claim as new and desire to secure by Letters Patent is the following, viz:

1. The method of obtaining basic titanic sulfate which comprises electrolyzing a titanic sulfate solution, and meanwhile heating it.

2. The method of obtaining basic titanic sulfate which comprises electrolyzing a titanic sulfate solution, and meanwhile heating it to temperatures below boiling.

3. The method of obtaining basic titanic sulfate which comprises converting a titanic sulfate solution into a titanic basic sulfate solution, electrolyzing such titanic basic sulfate solution, and meanwhile heating it sufficiently to precipitate therein basic titanic sulfate.

4. The method of obtaining basic titanic sulfate which comprises adding slaked lime to a titanic sulfate solution, filtering out resulting calcium sulfate, electrolyzing the resulting filtrate, and heating it to temperatures below boiling.

5. The method of treating a titanic sulfate solution which comprises passing an electrical current therethrough between a pair of thereby-contacted electrodes, and meanwhile heating the solution.

6. The method of treating a titanic solution which comprises electrolyzing it, and meanwhile heating it.

7. The method of producing a titanic oxid product which comprises simultaneously electrolyzing and heating a titanic solution, and thereafter separating therefrom, and calcining, the resulting precipitate.

LOUIS E. BARTON.

Witnesses:
 Tom C. Graham,
 George A. Ostertag.